UNITED STATES PATENT OFFICE.

JOSEPH W. RICHARDS, OF SOUTH BETHLEHEM, PENNSYLVANIA.

TREATMENT OF MOLTEN STEEL.

1,037,536.  Specification of Letters Patent.  Patented Sept. 3, 1912.

No Drawing.  Application filed December 8, 1910. Serial No. 596,236.

*To all whom it may concern:*

Be it known that I, JOSEPH W. RICHARDS, a subject of the King of Great Britain, residing at South Bethlehem, Northampton county, Pennsylvania, have invented certain new and useful Improvements in the Treatment of Molten Steel; and I do hereby declare the following to be a full, clear, and exact description of the invention, such as will enable others skilled in the art to which it appertains to make and use the same.

Bessemer, open-hearth, crucible or electric-furnace steel is manufactured in the usual way, and brought into the finished condition as far as concerns the furnace in which it is manufactured. Before being cast into molds, while still molten, it is, in the practice of my invention, transferred into a separate electrically-heated furnace, and kept therein in the molten condition a suitable time. It is then cast.

Among the objects thus attained may be catalogued the escape of gases, the floating up of impurities, the fixation of evolved impurities by union with the lining of the furnace, completion of the intimate alloying of the ingredients of the steel, increased liquidity of the metal, and the exact regulation of the casting temperature. These objects are all attained without any addition of such re-agents, as are usually added to molten steel to oxidize, de-oxidize or otherwise refine it. Such additions, for such purposes, are in the practice of this process relegated to the furnaces preceding the separate electrically-heated furnace referred to, and the latter furnace is to receive, from the former, steel finished in these respects, that is, as completely finished as is commercially practicable. By thus relegating the ordinary oxidizing, de-oxidizing and refining operations incident to the manufacture of steel to the furnaces preceding the separate electrically-heated furnace referred to, it is possible to do the above mentioned operations under more favorable conditions, often to operate them more cheaply, and in furnaces better arranged for their performance. This leaves to the electrically-heated furnace referred to, simply the task of keeping the otherwise finished steel molten a suitable time, frees it from operations to which it may be unsuited, and allows the use of a type or style of furnace free from the requirement of suitability for performing the ordinary oxidizing, de-oxidizing or refining operations. In short, this invention does not contemplate treatment in the separate electrically-heated furnace referred to, by such additions as are usually made to oxidize, de-oxidize or refine steel; but its object is to attain cheaply and economically such improvement in the otherwise finished steel as is obtained by keeping it molten for a suitable time in a separate electrically-heated furnace, as an immediate precedent to the operation of casting. The type of electric furnace which I prefer to use for this purpose is the induction furnace, although electrode or other forms of electric furnaces can be also used. The reason for my preference is that, not contemplating the addition of agents for oxidizing, de-oxidizing or refining the bath, the induction furnace is quite suited for the operation of my process, with the advantage over non-induction furnaces of the saving of cost of electrodes consumed. It has the further advantage of simpler operation because of the absence of electrodes and the dispensing with their cost and regulation. The induction furnace also provides in general a more uniform heating of the body of steel in the furnace; and still further obviates any possibility of change in the composition of the steel in the furnace from the carbon of electrodes or the ash of the same.

The lining of the electric furnace which I prefer to use is that known as "acid" lining, although "basic" lining can also be used. The reason for my preference in this regard is that the final step in the manufacture of steel is usually the addition of agents to de-oxidize and refine it, as has already been explained above, and that the acid lining of my electric holding furnace is more suited to the purpose of fixing the suspended oxids, the products of the preceding oxidizing and de-oxidizing operation, than a basic lining. The time of holding or keeping the steel molten in the said electric furnace may be varied from a few minutes to an hour, or even longer if found necessary or desirable, but in the majority of cases one-half an hour will be found sufficient to produce such satisfactory improvement in the steel as will justify the use of the process of this invention. This final furnace, which I may term a "holding furnace," and the operation a "holding operation," can be used, for example, either "acid" lined or "basic" lined upon otherwise finished steel made by any of the following methods or combinations of methods: 1. Acid Bessemer. 2. Basic Bessemer. 3. Acid open-hearth. 4. Basic open-hearth. 5. Acid Bessemer—acid open-hearth. 6. Acid Bessemer—acid open-hearth—acid electric. 7. Acid Bessemer—acid open-hearth—basic electric. 8. Acid Bessemer—basic open-hearth. 9. Acid Bessemer—basic open-hearth—acid electric. 10. Acid Bessemer—basic open-hearth—basic electric. 11. Basic Bessemer—acid open-hearth. 12. Basic Bessemer—acid open-hearth—acid electric. 13. Basic Bessemer—acid open-hearth—basic electric. 14. Basic Bessemer—basic open-hearth. 15. Basic Bessemer—basic open-hearth—acid electric. 16. Basic Bessemer—basic open-hearth—basic electric. 17. Acid Bessemer—acid electric. 18. Acid Bessemer—basic electric. 19. Basic Bessemer—acid electric. 20. Basic Bessemer — basic electric. 21. Acid open-hearth — acid electric. 22. Acid open-hearth — basic electric. 23. Basic open-hearth — acid electric. 24. Basic open-hearth — basic electric. 25. Crucible. 26. Acid electric. 27. Basic electric. 28. Acid electric—basic electric. 29. Basic electric—acid electric.

By finished steel, in the intent of the foregoing specification, it will be understood that I mean steel fully manufactured in the preliminary furnace treatment contemplated in so far as concerns the elimination of its deleterious impurities and which is otherwise ready for casting at the termination of the furnace operation according to the commercial practice. Such finished steel, molten and otherwise ready for casting, may, in addition to receiving the benefits of its sojourn in the electric holding furnace, in accordance with my invention, be alloyed therein, for the production of a special alloy steel, if that is contemplated.

Having thus described my invention what I claim is:

1. The treatment of molten steel consisting in transferring it into an electric furnace when finished, molten and otherwise ready for casting, there maintaining it in the molten state, and thereafter casting.

2. The treatment of molten steel consisting in transferring it into an induction electric furnace when finished, molten and otherwise ready for casting, there maintaining it in the molten state, and thereafter casting.

3. The treatment of molten steel consisting in transferring it into an acid-lined electric furnace when finished, molten and otherwise ready for casting, there maintaining it in the molten state, and thereafter casting.

4. The treatment of molten steel consisting in transferring it into an acid-lined induction electric furnace when finished, molten and otherwise ready for casting, there maintaining it in the molten state, and thereafter casting.

5. The treatment of molten steel consisting in transferring it into an electric furnace when finished, molten and otherwise ready for casting, there maintaining it in the molten state, converting it into a special alloy steel by adding alloying metal, and thereafter casting.

In testimony whereof I affix my signature, in presence of two witnesses.

JOSEPH W. RICHARDS.

Witnesses:
JOHN C. PENNIE,
WILLIAM H. DAVIS.